INVENTORS.
MICHAEL KNIAZUK
FRED R. PREDIGER
BY Edmund H. O'Brien
ATTORNEY.

Patented Nov. 29, 1949

2,489,899

UNITED STATES PATENT OFFICE 2,489,899

WEIGHING DEVICE

Michael Kniazuk, Mountainside, and Fred R. Prediger, Elizabeth, N. J., assignors, by mesne assignments, to Merck & Co., Inc., Rahway, N. J., a corporation of New Jersey Application August 1, 1947, Serial No. 765,340

8 Claims. (Cl. 249—2)

This invention relates generally to automatic weighing devices. More particularly, it relates to an automatic, sensitive balance for the recording and measuring of very light weights with the aid of electrically controlled auxiliary mechanisms.

The conventional automatic scales employing electrical control systems provide means for automatically shutting off the movement of material to be weighed to a scale when a predetermined weight is reached. This is usually accomplished by placing the indicator of a scale between a light source and a photoelectric cell in such a manner that no light enters the photoelectric cell when the scale is in equilibrium. When the equilibrium is disturbed, by placing a weight on the scale, the indicator moves from its rest position, permitting light to reach the photoelectric cell which in turn actuates a feeding device delivering material to the scale. As the scale approaches its normal rest position, the movement of the indicator gradually diminishes the amount of light reaching the photoelectric cell which results in a gradual reduction of the material being conveyed to the scale until an equilibrium is reached. This system, while capable of excellent results, when relatively heavy weights are measured, is not applicable to sensitive balances such as the analytical balances used for the weighing of small quantities of material because of the length of time required to restore equilibrium.

We have now found that we can reduce the apparent period of a standard balance by a factor of 50 to 100 without affecting the sensitivity of the scale or modifying it mechanically. Reduction of the period is accomplished electronically and the factor of 50 to 100 is the practical limit attainable with standard electrical components. The increase in speed offers the possibility of conveying the material to the balance mechanically and automatically cutting off the flow when the desired weight is reached, even before the balance has reached its normal rest position. Our system also provides means for the direct reading of the weight of a substance almost instantaneously after placing the substance on the balance.

In any system which moves with simple harmonic motion, the force tending to restore the system to its normal rest position is directly related to the sum of the instantaneous displacement and acceleration of the system as measured from the normal rest position. Any system moving with simple harmonic motion can be completely described by the following equation:

$$-ks = M\frac{d^2s}{dt^2}$$

$M$=total mass of the system, $s$=displacement, $t$=time, $ks$=restoring force proportional to displacement, and $\frac{d^2s}{dt^2}$=the acceleration at distance S.

It is assumed that there are no external forces, damping or friction present. If the system is disturbed by an external force in the form of an added weight $w$, the system will move according to $$w-ks=\left(M+\frac{w}{g}\right)\frac{d^2s}{dt^2}$$

If $$\frac{w}{g}$$

is very much smaller than $M$, $w$ will very nearly equal $$w=ks+M\frac{d^2s}{dt^2}$$

which is the sum of the instantaneous displacement and acceleration, the proportions depending on the constants of the system. Since a free-swinging sensitive balance resembles such a system very closely, it would be possible to know the natural rest position of the balance if the instantaneous deflection and acceleration were known. The total deflection of a balance is given directly by the indicator attached to the beam. We have found that we can derive the acceleration from the total deflection electronically. By translating the displacement to a proportional voltage change, it is possible to derive by means of electrical networks, the approximate instantaneous acceleration from the displacement voltage. By adding the accelerating voltage and the displacement voltage in proper proportions the resultant is very nearly equal to $w$ in a relatively short time after $w$ is applied.

The operation of our improved weighing apparatus will best be understood by consideration of the accompanying drawing in which the various elements are identified by suitable reference characters:

Figure 1:
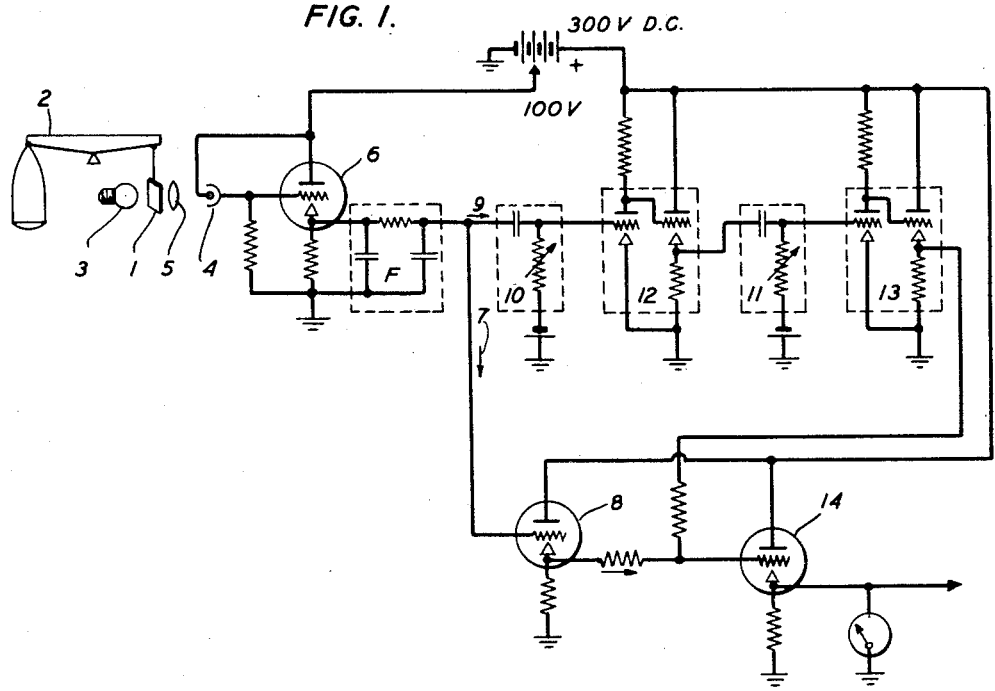
Fig. 1 represents a scale balance, actuating means, circuit and meter for indicating changes in scale loading.
Figure 2:
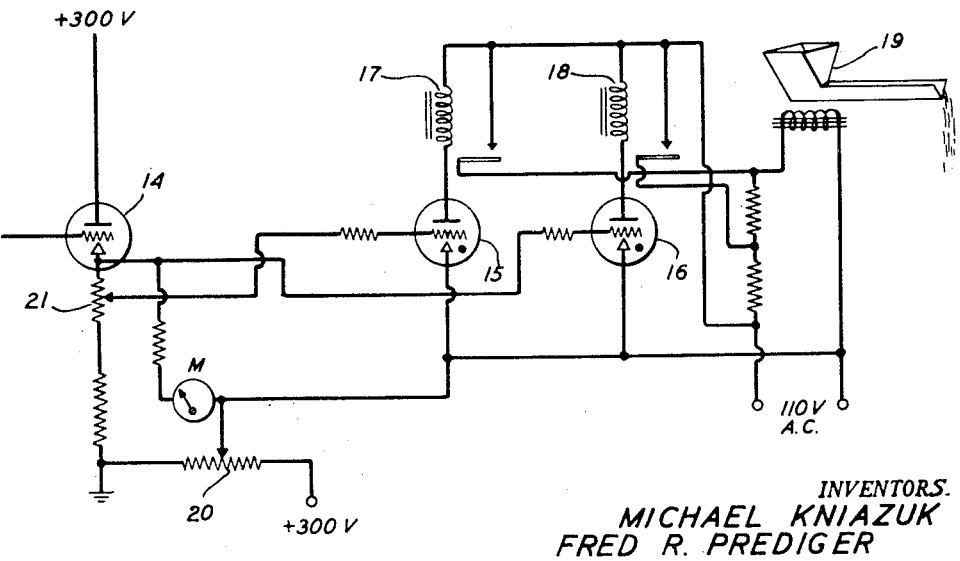
Fig. 2 represents a circuit and feeder means whereby the device of Fig. 1 may be utilized to control the feeder delivering material to be weighed.

A vane 1 mounted on one of the pans of a balance 2 moves between a light source 3 and a photoelectric cell 4. The light focused on the cell by lens 5 is constant and uniformly distributed so that as the vane moves, the output voltage of the photoelectric cell is directly related to the deflection of the balance. The output of the photoelectric cell is applied between the grid and the anode of the amplifier 6 which has an amplification of slightly less than unity and merely acts as a coupling device. A filter circuit F is connected across the cathode follower resistor of the amplifier tube 6 and the output of this filter circuit is connected to the input of two channels 7 and 9, one of these channels 7 including the tube 8 and the other of these channels 9 comprising the resistor-capacitor network 10 connected to the input of the amplifier cascade 12, a second resistor-capacitor network 11 connected to the cathode follower resistor forming the output of the amplifier cascade 12 and a second amplifier cascade 13 connected to the resistor-capacitor network 11. The cathode follower resistor of the amplifier 8 and the cathode follower resistor of the amplifier cascade 13 are connected together through suitable resistors to the grid electrode of the amplifier 14 which is also provided with a cathode follower resistor that is connected to an indicating device such as a meter or to an electrical feeder control associated with the balance 2. The anode circuits of all of the amplifiers and the photoelectric cell are supplied from a common battery or suitable source of rectified alternating current supply.

The resistor-capacitor networks 10 and 11 are each of short time constant and are connected as differentiators, the network 10 being connected to the network 11 by the two stage direct coupled cascade amplifier 12 so that the signal fed from the differentiating network 10 to the differentiating network 11 is amplified. The output of the differentiating network 11 is coupled to the input of the two stage direct coupled cascade amplifier 13 similar to the amplifier 12 and the output of this latter differentiating circuit is accordingly amplified before the application thereof to the input of the amplifier 14.

The output signal of channel 9 is an approximate second derivative of the input. Since the the input signal is proportional to the deflection, the output is therefore, proportional to the acceleration: If $\Delta w$ represents a sudden application of a small weight and $s(t)$ is an instantaneous movement of the vane as a function of time determined by the period of the scale, $e(t)$ will be a translation of scale motion by a photocell to a voltage change as a function of time. Thus in accordance with the equation describing a system moving with simple harmonic motion $$\Delta w = e(t) + \frac{d^2 e(t)}{dt^2}$$

wherein $$\frac{de(t)}{dt}$$

is a derivative of displacement voltage corresponding to the instantaneous velocity of the balance. Accordingly $$\frac{d^2 e(t)}{dt^2}$$

is a second derivative of the displacement voltage corresponding to the instantaneous acceleration of the balance.

The resultant output of tube 13 is of varying voltage proportional at all times to the instantaneous acceleration of the balance. The output of both channels 7 and 9 is mixed linearly in proper proportion at the grid of tube 14.

The output of both channels is added in proper proportion at the grid of a tube 14. The output of this tube, yielding a voltage proportional to the sum of the acceleration and deflection, is a constant voltage as long as the load on the balance is constant regardless of whether the scale is oscillating or standing still and is at all times equal to the weight on the balance. If the load on the scale is changed, the output of the tube will change almost instantly to the new load value. The control voltage from tube 14 may be used to actuate a meter. This voltage can also be utilized to control a feeder delivering material to be weighed, directly to the balance. When a desired amount of material is to be weighed out, a counterweight equal to that amount is placed on the right side pan. The equilibrium is disturbed which results in a voltage output of tube 14. This voltage has the proper direction to place the tubes 15 and 16 in a state of conduction. The 110 volt A. C. current supply is turned on either manually or automatically. The vibro-feeder will then start delivering material to the left pan until equilibrium is restored as indicated by the voltage of tube 14. The vibro-feeder 19 is of the conventional type using an electromagnetic motor but modified to operate effectively on small quantities.

Two thyratrons and relays are used, so that initially the feed rate is high. As balance is approached 15 is cut off first, which merely reduces the feed rate by introducing some resistance into the feeder supply. At balance 16 is cut off and stops the vibro-feed and the 110 volt current supply is then interrupted. The cut-off point of the two thyratrons relative to each other is determined by control 21, the final cut-off is set by control 20.

This system can be used on a scale having a natural period of 8 seconds to weigh out quantities of material of the order of 100 mg. in about 5–6 seconds with an accuracy of ±1 mg. On the other hand, the voltage can be used to actuate a meter showing substantially instantaneously, the rest position of the balance. Calibration of such a meter can be prearranged to indicate directly the weight on the balance.

It is to be understood that this invention is not limited to the use of photocell to generate the deflection voltage. Alternatively the deflection voltage can be generated by the use of a change in capacitance or a change in self or mutual inductance. Furthermore one of the above can be used to generate the deflection voltage, while simultaneously causing the scale to move a permanent magnet in a solenoid to generate a voltage which is proportional to the velocity of the scale. In this event a single stage of differentiation is required to obtain aceleration. The acceleration voltage and the deflection voltage are then combined as in the method described.

Various changes and modifications might be made in our invention, as described, without departing from the scope thereof. To the extent that such changes and modification procedures are within the scope of the appended claims, they are to be considered as part of our invention.

We claim:

1. A weighing apparatus comprising a sensitive balance and a vane attached to and moving with one pan of said balance, a light source on one side of the plane of movement of said vane, a photoelectric cell on the other side of the plane of movement of said vane for creating a voltage varying with the movement of the vane, a pair of circuit networks, means for introducing said voltage to said pair of circuit networks, one of said networks comprising a substantially linear circuit yielding an output voltage proportional to the instantaneous displacement of the balance, the other of said pair of circuit networks comprising two resistance-capacitance networks yielding an output voltage proportional to the acceleration of the balance and means for adding the output voltage of both of said circuit networks, thereby forming a voltage instantaneously responsive to weight changes on the balance.

2. A weighing apparatus comprising a sensitive balance and a vane attached to and moving with one pan of said balance, a light source on one side of the plane of movement of said vane, a photoelectric cell on the other side of the plane of movement of said vane for creating a voltage varying with the movement of the vane, a pair of circuit networks, means for introducing said voltage to said pair of circuit networks, one of said networks comprising a substantially linear circuit yielding an output voltage proportional to the instantaneous displacement of the balance, the other of said pair of circuit networks comprising two resistance-capacitance networks yielding an output voltage proportional to the acceleration of the balance, an electron discharge device having a grid electrode, and means for applying the outputs of both of said circuit networks to the grid of said electron discharge device, thereby forming a voltage instantaneously responsive to weight changes on the balance.

3. A weighing apparatus comprising a sensitive balance and a vane attached to and moving with one pan of said balance, a light source on one side of the plane of movement of said vane, a photoelectric cell on the other side of the plane of movement of said vane for creating a voltage varying with the movement of the vane, a pair of channels coupled to the output of said photoelectric cell, one of said channels comprising a substantially linear network yielding an output voltage proportional to the instantaneous displacement of the balance, the other of said channels comprising two resistance-capacitance networks and two amplifiers yielding an output voltage proportional to the acceleration of the balance and means for adding the output of both said channels, thereby forming a voltage instantaneously responsive to weight changes on the balance.

4. A weighing apparatus comprising a sensitive balance, means for generating a voltage varying in accordance with the movement of said balance, a pair of channels connected to said means, one of said channels comprising a linear network yielding an output proportional to the instantaneous displacement of the balance, the other channel comprising two resistance-capacitance networks and two amplifiers yielding an output voltage proportional to the acceleration of the balance, a vacuum tube connected to the outputs of both said channels and a meter connected to the output at said vacuum tube.

5. A weighing apparatus comprising a sensitive balance, means for generating a voltage varying in accordance with the movement of said balance, a pair of channels connected to said means, one of said channels comprising a linear network yielding an output voltage proportional to the instantaneous displacement of the balance, the other of said channels comprising two resistance-capacitance networks and two amplifiers yielding an output voltage proportional to the acceleration of the balance, a vacuum tube connected to the output voltages of both said channels, a feeder for said balance, and means for causing the output voltage at said tube to actuate said feeder.

6. A weighing apparatus comprising a sensitive balance, means for generating a voltage varying in accordance with the movement of said balance, a pair of channels connected to said means, one of said channels comprising a linear network yielding an output voltage proportional to the instantaneous displacement of the balance, the other of said channels comprising two resistance-capacitance networks yielding an output voltage proportional to the acceleration of the balance, and means for adding the output voltages of both channels, thereby forming a voltage instantaneously responsive to weight changes on the balance.

7. A weighing apparatus comprising a sensitive balance and a vane attached to and moving with one pan of said balance, a light source on one side of the plane of movement of said vane, a photoelectric cell on the other side of the plane of movement of said vane for creating a voltage varying with the movement of the vane, a vacuum tube connected to said photoelectric cell, a pair of channels connected to the output of said vacuum tube, one of said channels comprising a linear network yielding an output voltage proportional to the instantaneous displacement of the balance, the other of said channels comprising two resistance-capacitance networks yielding an output voltage proportional to the acceleration of the balance, and means for adding the output voltages of both said channels.

8. In combination with a sensitive balance and mechanical feed means for delivery of material to said balance, electronic means instantaneously responsive to weight changes on the balance for producing a voltage proportional to the instantaneous displacement of the balance, an electrical network connected to said electronic means for producing a second voltage proportional to the acceleration of the balance, means for adding the first mentioned voltage to said second voltage and means connected to said last-mentioned means for actuating said feeder.

MICHAEL KNIAZUK.
FRED R. PREDIGER.

REFERENCES CITED

The following references are of record in the file of this patent:

UNITED STATES PATENTS

| Number | Name | Date |
|---|---|---|
| 1,846,148 | Rumpf | Feb. 23, 1932 |